United States Patent [19]

Milan et al.

[11] Patent Number: 4,851,850
[45] Date of Patent: Jul. 25, 1989

[54] PRIORITY MAPPER FOR INITIATION OF RADAR TRACKING OF PROJECTILES

[75] Inventors: John M. Milan, Canoga Park; George W. Grantham, West Covina, both of Calif.

[73] Assignee: ITT Gilfillan, A Division of ITT Corporation, Van Nuys, Calif.

[21] Appl. No.: 652,982

[22] Filed: Sep. 21, 1984

[51] Int. Cl.[4] .............................................. G01S 7/46
[52] U.S. Cl. ..................................................... 342/90
[58] Field of Search ............................. 343/74; 342/90

[56] References Cited

U.S. PATENT DOCUMENTS

| | | | |
|---|---|---|---|
| 3,460,137 | 8/1969 | Ralston | 342/90 X |
| 3,836,964 | 9/1974 | Evans | 342/90 |
| 4,005,415 | 1/1977 | Kossiakoff et al. | 342/90 |
| 4,074,264 | 2/1978 | Wilmot | 342/90 |

Primary Examiner—T. H. Tubbesing
Attorney, Agent, or Firm—Thomas N. Twomey; Mary C. Werner

[57] ABSTRACT

Electronic priority map storage and control for prioritizing radar detections for fire control or monitoring purposes relative to batteries of mortars or artillery or other projectile sources. Use of a priority map to increase probability of location of at least one weapon in each battery is desired. The theory is based upon the premise that all guns in a battery are firing at the same target and, consequently, all projectiles from a battery will be detected within a relatively small area. By distributing track initiations over a large area of detection, the probability of tracking projectiles from all batteries is increased. The use of the priority map to accomplish this function is made in order to save time in a general purpose data processing computer employed additionally for other functions. A group of priority map cells are combined to form a track initiation cell. That is, a second map is formed with coarser granularity for the purpose of controlling the priority of track initiations. Each of the track initiation cells maintains a two-bit (four-state) count indicating the priority of track initiation for targets detected within the cell. A count of zero indicates the highest priority, while a count of three indicates the lowest priority. At the start of operation, the count in each is set to zero. When a target track is initiated as a result of a detection within a given track initiation cell, the priority count is incremented by one. When the track rate exceeds a predetermined value, the data processor instructs the signal processor to ignore detections from low track initiation cells (cells with a count greater than zero). When the track rate diminishes, the count in all cells having a count greater than zero are decremented by one. If the track rate remains acceptable over a predetermined period of time, the decrementation process is repeated.

2 Claims, 10 Drawing Sheets

PRIORITY CONTROL BY PRIORITY MAP

PRIOR ART PRIORITY CONTROL BY G.P. COMPUTER

PRIORITY CONTROL BY PRIORITY MAP

FIG. 3 PLAN VIEW
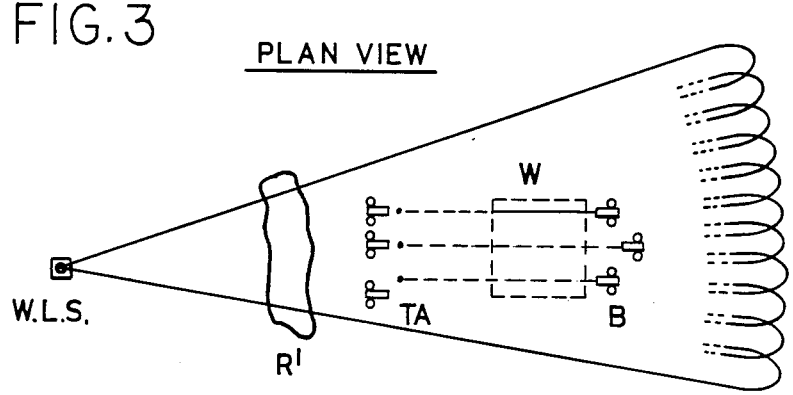
FIG. 4 ELEVATION VIEW
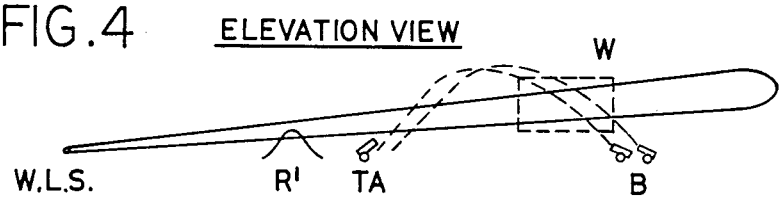
CONCEPTUAL LAYOUT
OF PRIORITY MAP
FIG. 5
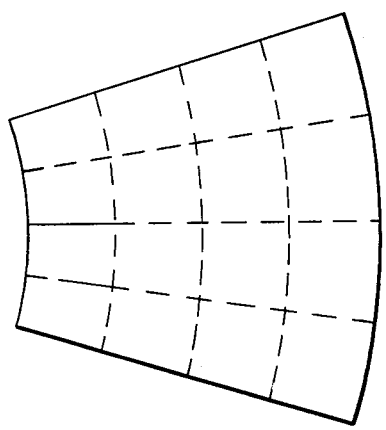
SUB-DIVISION OF MAP CELLS
FIG. 6

PRIORITY MAP 0

PRIORITY MAP 1

PRIORITY MAP 2

PRIORITY MAP 3

PRIORITY MAPPER FOR INITIATION OF RADAR TRACKING OF PROJECTILES

BACKGROUND OF THE INVENTION

This invention relates to a priority map for control or other purposes such as, for example, monitoring the fire from artillery and/or mortar batteries.

PRIOR ART STATEMENT

Multifunction radars perform the general tasks of target detection, track-initiation, track-promotion, target tracking and various forms of processing of target track data in achieving the intended functions of the radar systems. Executions of these tasks involve adaptive allocations of time and energy, the basic radar resources among these various tasks. Limitation of radar resources may prevent the tracking of all targets within the radar coverage at some level of target density.

When the target density exceeds this saturation level, some form of track initiation priority must be invoked. Priority assignment rules could be as simple as "first-come/first-serve" or could be very sophisticated involving combinations of discriminants such as: detection location, various aspects of spatial distribution, indication of velocities via measurement of doppler frequency shift, and chronological sequence of detection.

Modern radar design usually includes the feature of programmable general purpose computers to control radar resources: the design of a priority assignment system then becomes a matter of determining the doctrine for assignment of priorities, developing the appropriate algorithms and generating the program instructions for the computer.

One basic limitation of the prior art is the excessive computational load imposed upon the general purpose computer in some radar applications. Specifically, the application of radar to the location of weapons (e.g., artillery pieces and mortars) may operate in a situation in which several hundred targets may appear simultaneously within the radar coverage volume. The use of a general purpose computer for the assignment of track initiation may be undesirable because of excessive computational requirements in terms of speed and memory size. Computer limitations may be intensified by military requirements for use of a standard computer.

In the past no special purpose hardware has existed to perform the tasks associated with priority determinations. No reduction in load on the general purpose computer has thus been made.

SUMMARY OF THE INVENTION

In accordance with the priority mapper of the present invention, the above-described and other disadvantages of the prior art are overcome by providing the storage of target detections in a plurality of priority maps, and prioritizing track initiations according thereto.

This invention provides means including efficient special purpose hardware to perform the tasks associated with priority determinations, thus reducing the load on a general purpose computer to an acceptable level.

The general objective of the assignment of priorities is the assurance that sufficient radar resources will be dedicated to the detection and tracking of the highest threat targets. For example, in a surface-based air-defense radar system, low-flying targets entering the radar field of view are given the highest priority because the available defensive reaction time is very limited. As the target load exceeds the point of exhaustion of radar resources, track initiation priority can be assigned in inverse relationship to the detection range. However, some capability is preserved for detection and tracking of longer range targets at the expense of some degradation of track quality of the short range targets. Hence, a doctrine for resource management should be developed in consideration of the likely operation all scenarios.

This invention is based upon a mapping technique made possible by the nature of the desired priority assignment doctrine in weapons location systems. The conventional deployment tactics of the guns used in field artillery involves a grouping of the guns into "batteries" of closely spaced weapons. Firing from all the guns in a battery is coordinated, with fire directed at a common target area and with a controlled firing sequence. While it is desirable to obtain precise location of all enemy guns, the goal in an environment of intense firing (in which the capability of tracking all targets is impossible) is to maximize the probability of locating all batteries, i.e., the goal is to maximize the probability of locating at least one gun in each battery.

In the typical design of prior art weapons locating radars, detection occurs in a narrow radar elevation fence positioned at a low elevation angle. Since it is assumed that the trajectories of all projectiles from a given battery will exhibit a relatively small dispersion, the plan projection of all detections associated with firings from that battery should be encompassed within a relatively small range-azimuth sector. The essence of the present invention is the use of a special purpose ("hardware") map divided into fixed range-azimuth cells as a means of association of projectile detections with batteries. New detections registered in map cells not associated with recent track initiations would enjoy high priority for track initiation. Immediately after a track initiation, the map cell which encompassed the coordinates of he detection leading to the track initiation is assigned a low priority. As time elapses the priority increases.

This scheme accomplishes the priority assignment objective of distributing the radar resources among the active batteries within radar coverage by the use of relatively simple hardware. This is accomplished at point in the data stream prior to processing in the general purpose computer.

BRIEF DESCRIPTION OF THE DRAWINGS

In the accompanying drawings which illustrate exemplary embodiments of the present invention:

FIG. 3 is a digrammatic view of ground locations of radar and target area;

FIG. 4 is a diagrammatic view of the radar and target area in the elevation plane;

FIG. 5 is a diagrammatic view of cells in a priority map;

FIG. 6 is a diagrammatic view of subcells in a priority map cell;

DESCRIPTION OF THE PREFERRED EMBODIMENT

Figure 1:
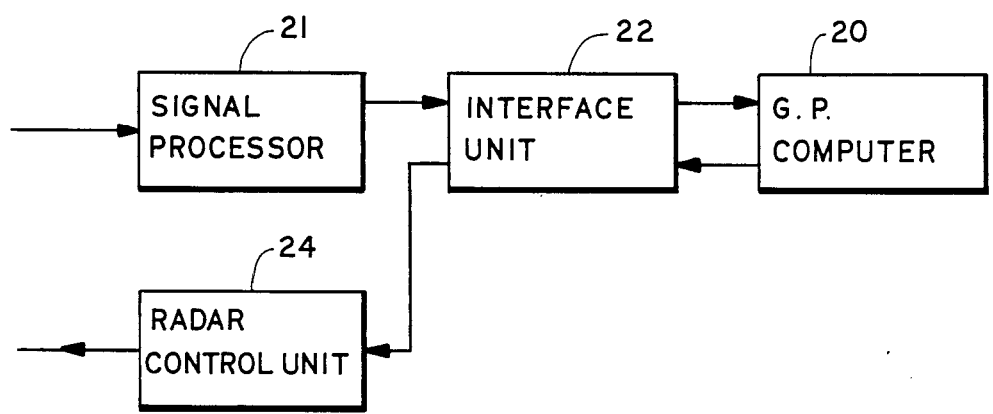
FIG. 1 is a block diagram of prior art priority control of a general purpose computer.
Figure 2:
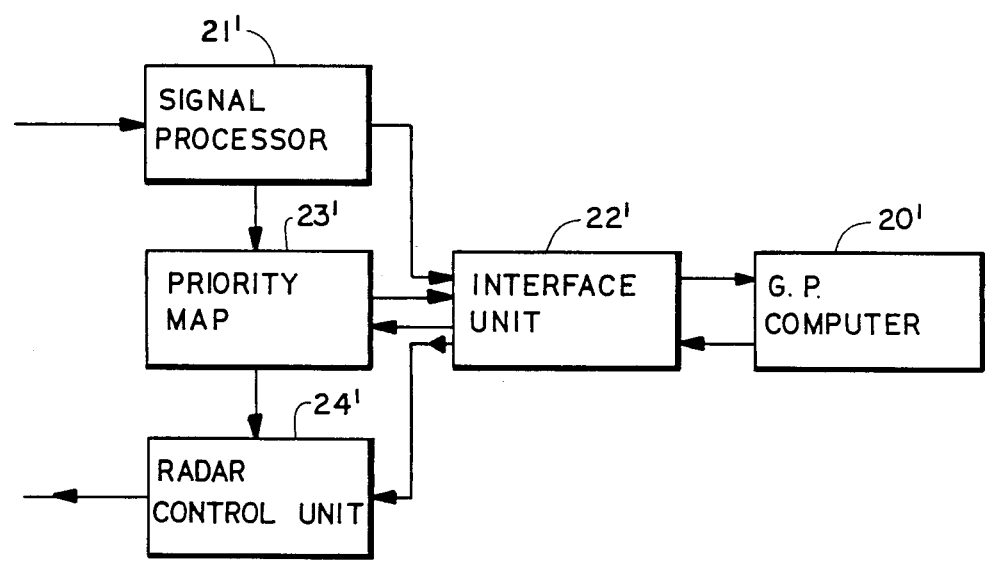
FIG. 2 is a block diagram of the priority control of the present invention.

FIG. 1 represents the prior art configuration in which the complete task of control of tracking functions, including tracking initiation, is executed by a general purpose (G.P.) computer 20. All target detections occurring in a signal processor 21 must be sent via an interface unit 22 to the general purpose computer 20 in which detections must be selected for attempted track initiation through a radar control unit 24. By addition of priority map 23' (FIG. 2), all or a major part of the decision process for detection selection can be accomplished without communication with the general purpose computer. This reduces the load both on the general purpose computer and on interface unit 22'.

In order to understand the operation of the priority mapper (map) 23', some of the features of a weapons location system (W.L.S.) must be considered. Referring to FIGS. 3 and 4, a search fence, covering some specified azimuth sector, is generated by step scanning an antenna beam(s). Shells passing through the search fence are detected and may then be tracked to a higher elevation angle by directing the beam(s) toward the target as it travels along the upper segment of its trajectory. The search function and track functions (including track initiations) are time shared in some fashion. For the sake of simplicity, a cycle is specified in which a complete azimuth sector is searched followed by a period dedicated to collection of track data.

Projectiles fired from cannons in a battery B must pass through the fence on the upward segments of their trajectories. This fence dimension is determined by the elevation beamwidth of the antenna and is, typically, less than 5 degrees. In some applications multiple beams may be stacked in elevation, but the total expanse with less than 5 degrees is employed. The fence is positioned as low as possible considering the limitaions imposed by the terrain. In FIGS. 3 and 4 the beam is elevated to just clear the obstruction imposed by a ridge R'. With all cannons at B firing at the same target are (TA), with the same quadrant elevation QE, and the same charge, the dispersion of detections are constrained to a window W. The azimuth and range dimensions of this window serve as the basis for the formtion of priority map cells.

Note that the shape of the plan view of the window W is expected to be rectangular; therefore, the azimuth dimensions of the priority map will vary in an inverse relationship with the range from the weapons location system.

A simple embodiment of the priority may comprises fixed, contiguous map cells as illustrated in FIG. 5. A refinement of the map may or may not include overlapping map cells for dealing with the uncertainty of registration of detection windows with the map cells. A record of the activity of each map cell is maintained in a digital memory register dedicated to that cell. The contents of that register (or series of registers) consists of two types of information. The first type is the location, within the cell, at which the detection occurred. This information is needed because the map cell dimensions based upon the intercept window size are larger than the permissable error acceptable in positioning the antenna beam and/or the range gate in the track initiation process. A convenient means of storing this data is the formation of subcells with dimensions commensurate with the required accuracy for track initiation as illustrated in FIG. 6. (Alternately, the organization of the map may be conceived as a grouping of smaller, elemental cells into larger cells for priority assignment.)

The second type of informaion comprises an indication of the priority status of the cell (i.e., including all subcells). For the sake of illustration, a two-bit word segment will be assumed for this function. The contents of this segment is a count $N_p$ which denotes priority: zero indicates highest priority, while three (11 in binary count) indicates the lowest priority.

Figure 7:
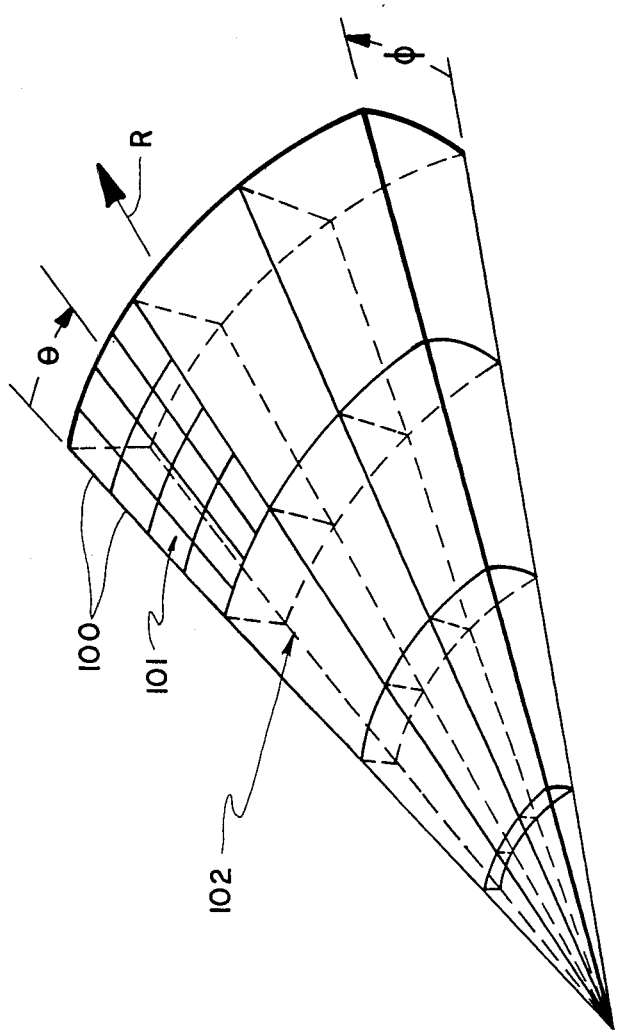
FIG. 7 is a perspective view of a priority map.

A perspective view of a three dimensional priority map is shown in FIG. 7 where $\phi$ is elevation, $\theta$ is azimuth, and R is range.

It is to be understood that some of the terms used herein are spatial or abstract, but that the invention is employed to describe and to record the location of a projectile. This is done in an electronic memory that has an input of three dimensions (R, $\theta$ and $\phi$) in digital form. The R, $\theta$ and $\phi$ for a specific projectile thus provide an address to a specific bistable device that when "0" indicates the absence of the projectile and when "1" indicates the existence of the projectile.

"Priority map" as used herein thus refers to the address provided for each of the subcell bistable devices for each cell shown, for example, in FIG. 7. In FIG. 7 subcells 100 are shown for one cell 101. Each cell 102 has plural subcells similar to subcells 100. The cells 102 and subcells 100 are three dimensional, the location of the centers thereof being R, $\theta$ and $\phi$.

Priority memory determines in which priority map a projectile location is stored.

Figure 8:
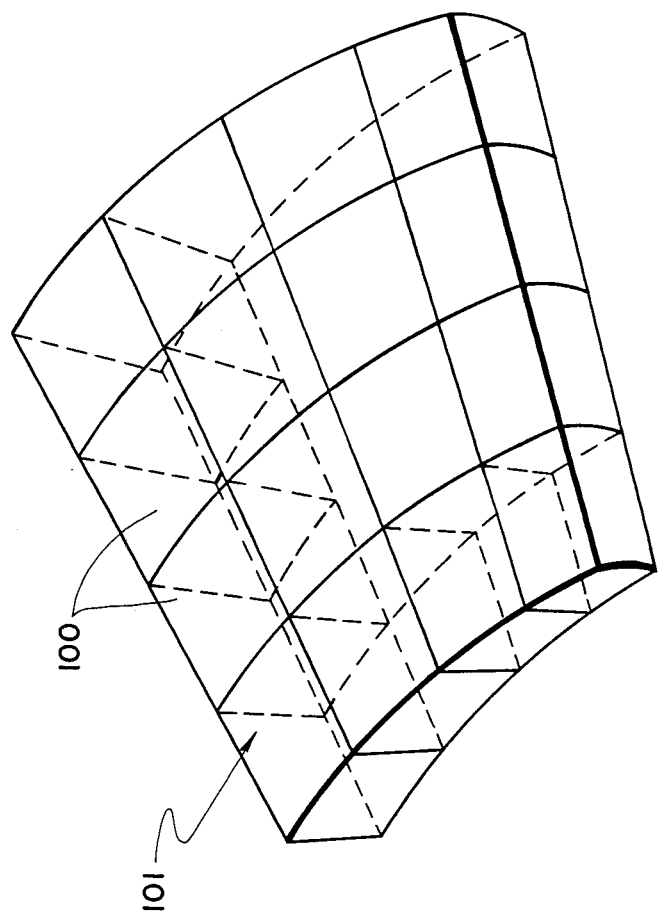
FIG. 8 is a perspective view of subcells in a priority map cell.
Figure 9:
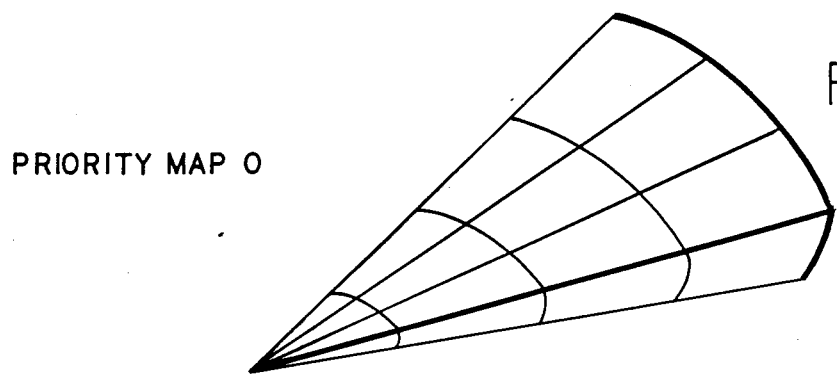
FIGS. 9-12 are perspective views of priority maps 0-3, respectively.
Figure 10:
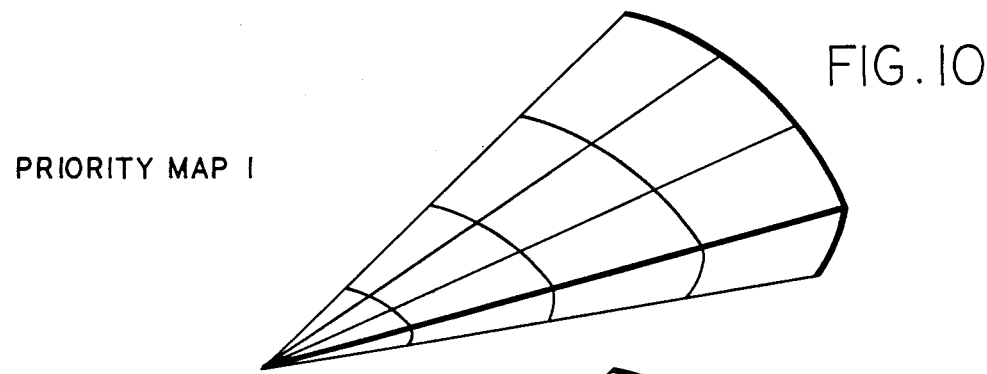
Figure 11:
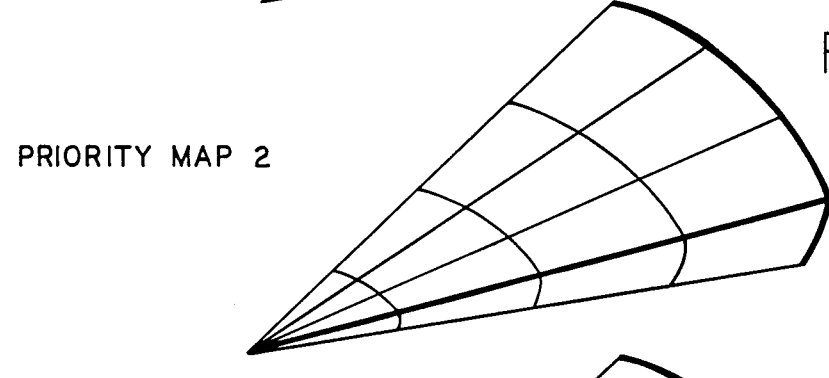
Figure 12:
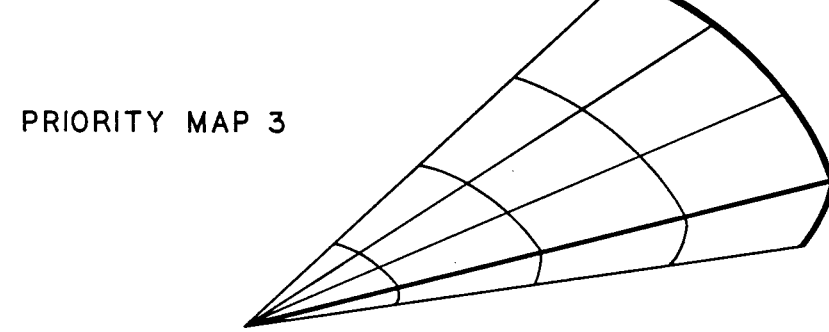

An enlarged view of cell 101 and some subcells 100 are shown in FIG. 8.

Subcells are provided in each cell in each of priority maps 0, 1, 2 and 3 shown in FIGS. 9-12, respectively. The subcells are not shown. Thus, an address is provided to each bistable device corresponding to each subcell in each cell in each priority map shown in FIGS. 9-12. The storage of a "1" in a bistable device corresponding to one particular address for a subcell is gated to a bistable device corresponding to a subcell in only one of the priority maps in FIGS. 9-12. There is thus K bistable devices for each subcell address where K is the total number of priority maps (e.g., four in FIGS. 9-12).

It is to be noted again that the spatial concept of the four priority maps also envisages the use of four corresponding memories including a bistable device in each memory corresponding to the same address.

Figure 13:
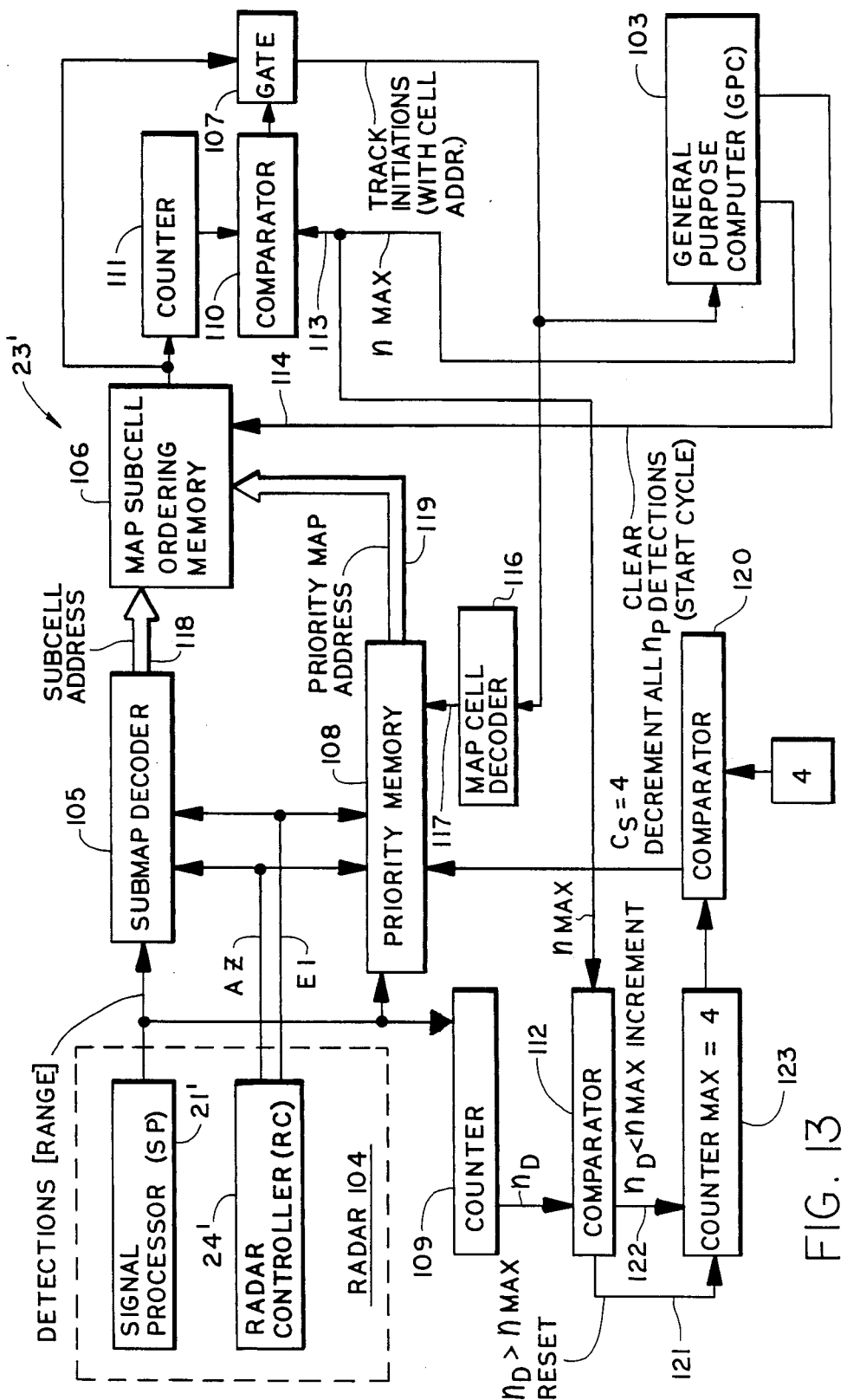
FIG. 13 is a detailed block diagram of one embodiment of the present invention.

Priority map 23 (FIG. 2) is shown in greater detail in FIG. 13 with a general purpose computer 103, a radar 104 including a radar controller 24' and signal procesor 21'.

OPERATION

A submap decoder 105, a map subcell ordering memory 106, and a gate 107 are connected from signal processor 21' to general purpose computer 103. Radar controller 24' provides azimuth and elevation data (Az and El) to both submap decoder 105 and a priority memory 108. Signal processor 21' provides range data (R) on detections to submap decoder 105, to priority memory 108, and to a counter 109.

Submap decoder 105 has an output bus connected to ordering memory 106 to supply a subcell address thereto.

Priority memory 108 has an output bus 119 connected to ordering memory 106 to supply a priority map address thereto.

The output of ordering memory 106 is connected to a gate 107 and also to a compartor 110 via a counter 111. The counter 111 counts detections which are being sent to the General Purpose Computer 103 via the gate 107 for track initiation.

The output of the gate 107 is also connected to map cell decoder 116 which has an output 117 connected to priority memory 108. When a track initiation is sent for a particular cell, the priority memory location for that cell is incremented if it has not been previously incremented in the current track cycle.

The GPC 103 has an output 113 connected to deliver $N_{max}$, the maximum number of possible track initiations, to comparator 110 and to another comparator 112. The GPC has another output 114 connected to clear detections in the ordering memory 106 at the end of the track cycle.

Counter 109 has an $N_D$ output connected to comparator 112. Comparator 112 produces a signal on one output 121 when $N_D > N_{max}$ and another signal on another output 122 when $N_D < N_{max}$. Both outputs 121 and 122 are connected to a counter 123. The output of counter 123 is connected to comparator 120 which is connectd to priority memory 108. The output of comparator 120 is $C_s$, which, when it equals 4, decrements all $N_p$ in the priority memory.

Figure 14:
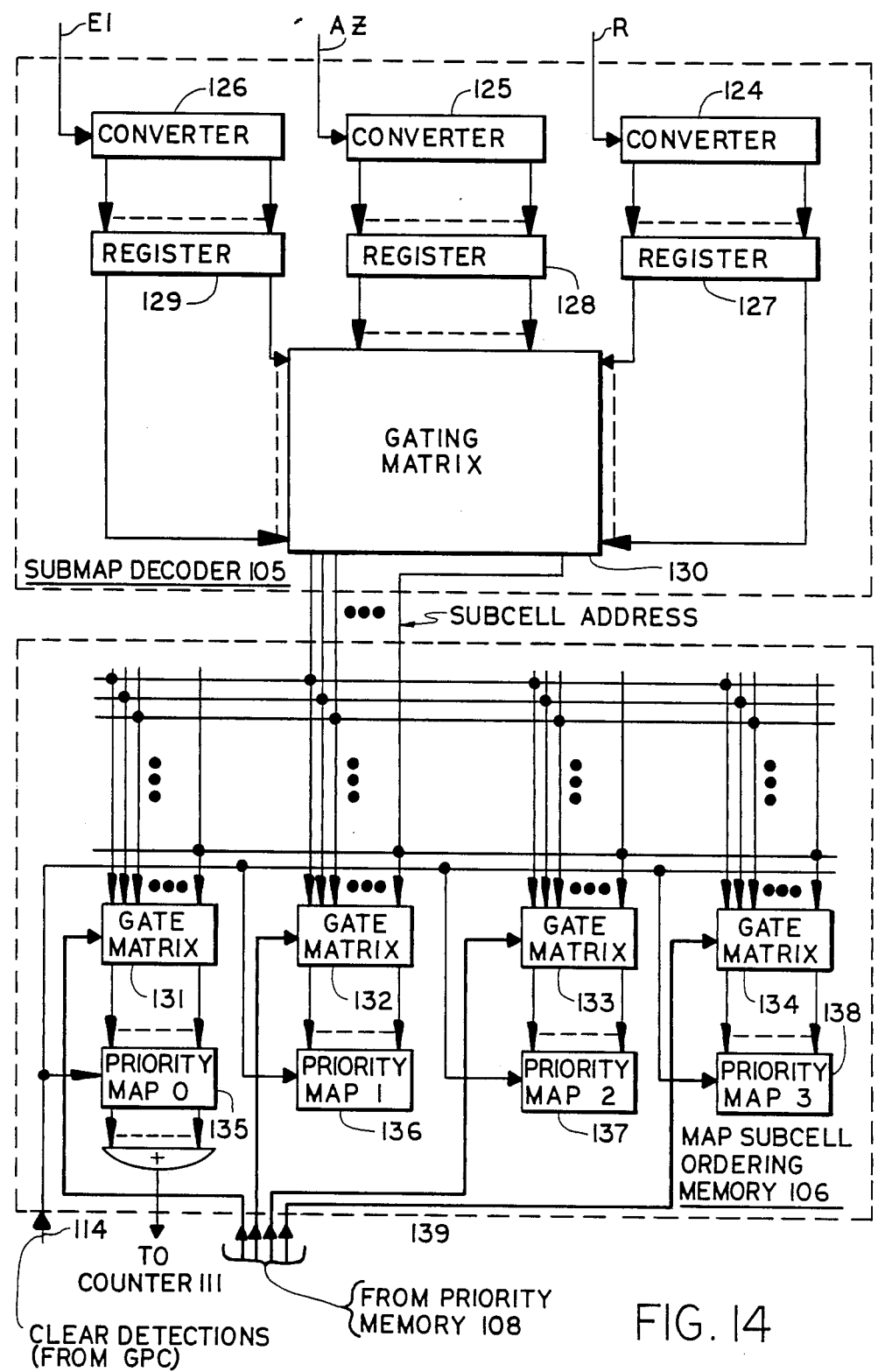
FIG. 14 is a block diagram of a map subcell ordering memory shown in FIG. 13.

Submap decoder 105 and ordering memory 106 are shown again in FIG. 14. Conventional converters 124–126 receive R, $\theta$ and $\phi$, respectively, and convert the data to digital information that is stored in registers 127–129. A conventional gating matrix 130 converts each present combination of R, $\theta$ and $\phi$ to a single digital number (address) representative of a single subcell location. The subcell address is then impressed upon all gate matrices 131–134 out of which the single address is stored in one of four priority maps 135–138 based upon which priority is selected from a group 139 of four buses from priority memory 108.

The number of priority maps is arbitrary although four (135–138) are shown.

Figure 15:
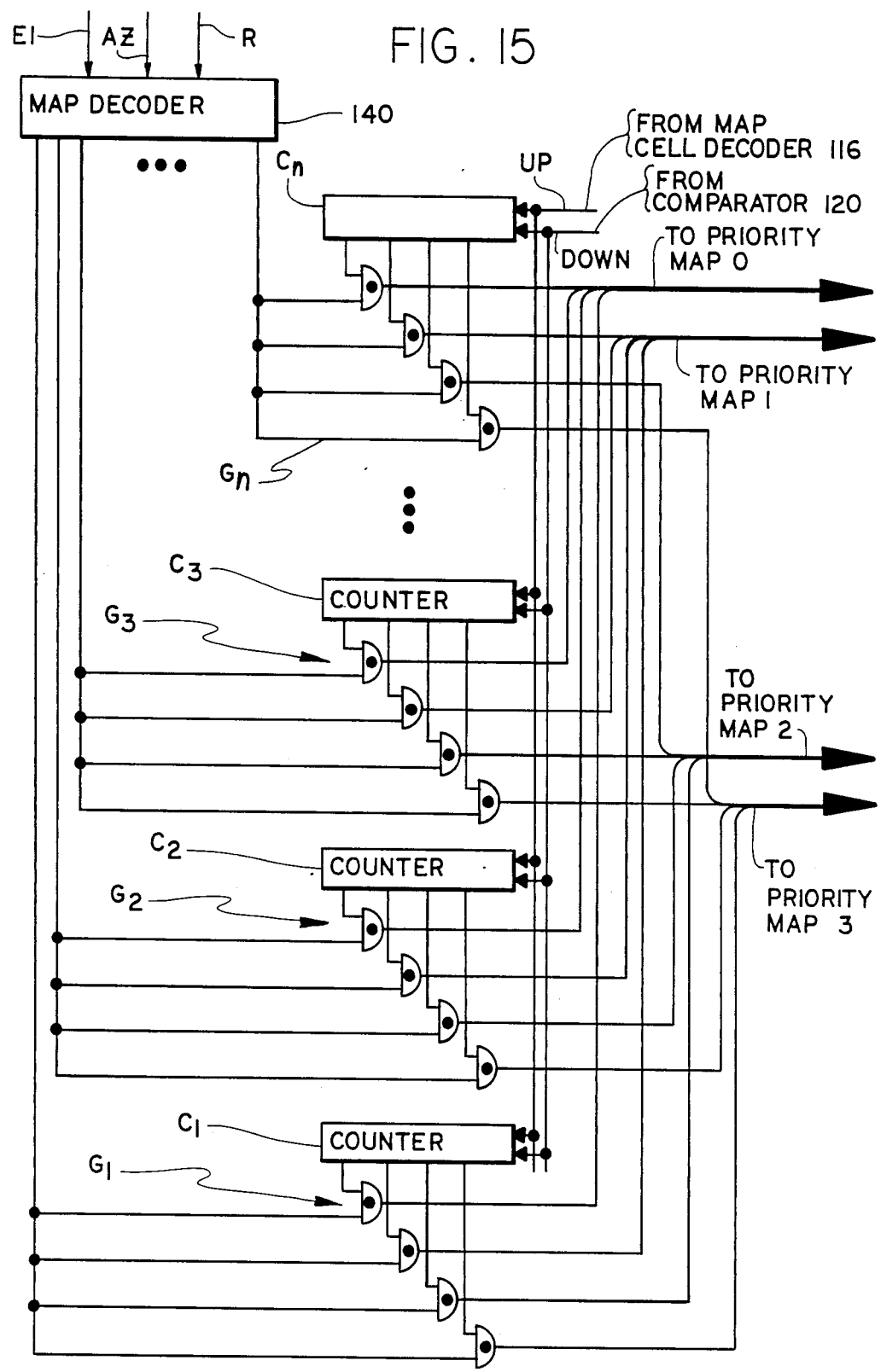
FIG. 15 is a block diagram of a priority memory shown in FIG. 13.

Priority memory 108 is shown again in FIG. 15 including a map decoder 140 which may be identical to or somewhat different from decoder 105. Decoder 140 may convert R, $\theta$ and $\phi$ into a single, but smaller, digital number representative of the present address (location) of a map cell. (There are fewer map cells than map subcells.)

Priority memory 108 has p long $N_p$ counters (e.g. four counters) $C_1$, $C_2$, $C_3$ ... $C_n$ which, via sets of gates $G_1$, $G_2$, $G_3$ ... $G_n$ gate out a code (address) to a particular priority map 135–138 which will enter the subcell address or set "1" input of a corresponding binary device from a single gate matrix 131–134 input thereinto.

Counters $C_1$–$C_n$ are incremented by map cell decoder 116 and decremented by comparator 120. Counters $C_1$–$C_n$ may be synchronous ring counters, if desired.

Figure 16:
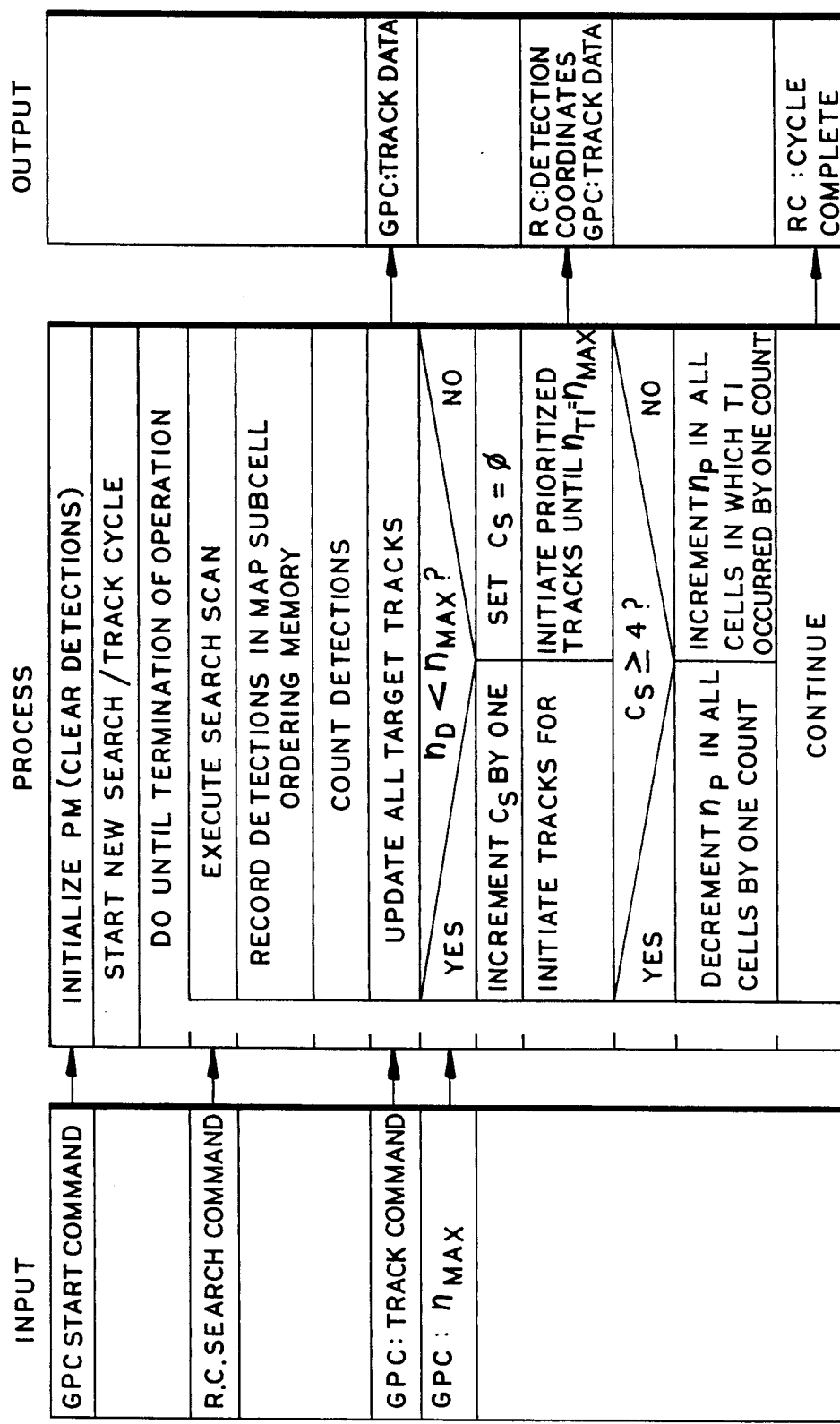
FIG. 16 is a flow chart for a search/track cycle.

The algorithms used to execute the priority mapping function are defined by use of the flow diagram shown in FIG. 16.

Figure 17:
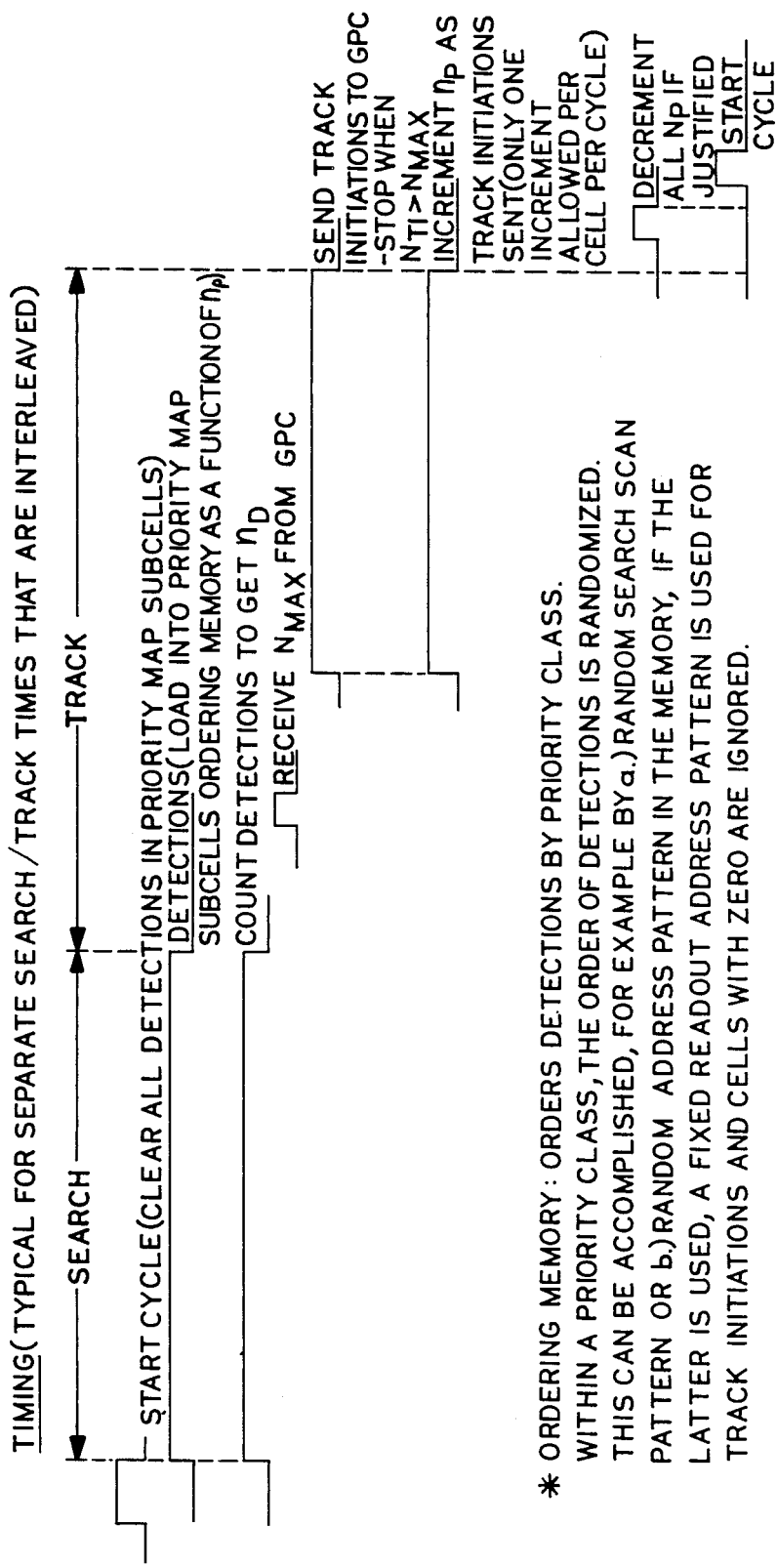
FIG. 17 is a timing diagram.

Note will be taken in FIG. 17 that each cycle has a search period succeeded by a tracking period.

Action of the priority mapping function is illustrated by reference to the following scenario.

a. The priority map is initialized by setting the priority count to zero and by setting $N_{max}$ in the GPC to some predetermined value (default value related to radar resources).

b. On the first search scan after initialization, detections are stored in the map subcell ordering memory and the count $N_d$ is continually updated.

c. At the end of the search scan, it is observed that $N_d < N_{max}$. Therefore, an attempt is made to initialize a track on each detection. For each successful track initiation, the count $N_p$ is incremented one unit (from zero to one) in the appropriate priority map cell with only one increment per cell allowed. At the and of the track period, the count $N_p$ is retained in each priority map cell, but the detection data in the map subcell ordering memory is erased. $N_{max}$ is updated in the GPC to reflect the new radar resources available for track initiation.

d. The second search/track cycle is similar to the first with $N_d < N_{max}$. Detections and track initiations are repeated in some of the same map cells that were active in the first search/track cycle, while some of the track initiations occur in new cells. Therefore, at the end of the second cycle, $N_p$ values of zero, one and two are distributed among the map cells. $N_{max}$ is again updated.

e. On the third search scan, due to the combinations of increased detection activity and an increased budget for tracking targets previously detected, it is observed that $N_d > N_{max}$. Following some predetermined geometrical sequence, track initiations are attempted in accordance with the priority status. At the end of the search/track cycle, detections are cleared as in the previous cycles.

f. For several subsequent search/track cycles, there is a variable number of detections such that $N_d > N_{max}$ of some cycles and $N_d < N_{max}$ for some cycles, but the value of $C_s$ never exceeds 4. During this time, the operation of the map assures highest priority to cells with the least number of track initiations. Multiple initiation will occur in some cells, increasing the value of $N_p$ in those cells. After reaching the maximum count of 3, that value will be retained until a decrement command is generated.

g. When detection activity diminishes to the point that $C_s = 4$, a decrement command is generated. Execution of this command results in decrement $N_p$ in all priority map cells by one count (minimum value after decrementation is zero). Decrementation continues on subsequent scans as lonmg as $C_s > 4$.

Application of the aforementioned priority map (PM) technique is most likely in a weapons location system that also contains some sort of clutter map (CM). The function(s) of the CM is to determine cells in which moving target indication (MTI) is applicable and/or to excise the clutte residue at the output of MTI filters.

The general relationships between the PM, and its extensions, and the CM are outlined below.

a. Sufficient operating time should be allowed for stabilization of the CM before commencement of track initiations and the operation of the PM. This can prevent a waste of radar resources on false tracks.

b. The output of the CM is used to modify the priority assignment in PM cells. For example, if a large percentage of the CM cells indicate a presence of clutter, the $N_p$ count is incremented for the assignment of a lower priority.

c. The general organizations of the PM and CM in terms of cells are similar. In some applications it is advantageous to use common cells for the two mapping functions with appropriate frames assigned to each.

The following refinements and/or alternatives in construction apply to the implementation of a particular system.

a. Cell dimensions must be calculated by use of radar design parameters, battlefield scenario and the characteristics of weapons/ammunition.

b. In the foregoing description some parameters which may be subject to change have been referred to as constants. These include: the number of bits (2) used for $N_p$, the priority count, and a threshold value for $C_s$ (4) at which a decrement of $N_p$ occurs.

c. In some applications the complete search/track cycle may be fragmented into several segments alternating between the search and track activities. An appropriate revision of algorithms must be made to accommodate this type of program.

This invention can be applied in the signal processor portion of a radar system designed to determine the location of artillery and other types of field weapons. Such a system may be called a Weapons Location System, an Artillery Location System or an Artillery Observation Radar.

GLOSSARY

| | |
|---|---|
| GPC | General Purpose Computer |
| PM | Priority Map |
| $N_d$ | Number of PM cells registering detections on last search scan |
| $N_p$ | Priority count on a PM cell |
| $N_{max}$ | Maximum number of new track initiations allocated by general purpose computer |
| $C_s$ | The count of sequential search/track cycles in which $N_{max} > N_d$ |
| RC | Radar Controller |
| TI | Track initiations |
| NTI | Number of track initiations in a particular cycle. |

What is claimed is:

1. A priority mapper for initiation of radar tracking of projectiles, said priority mapper comprising: a radar system including a signal processor for producing a range signal corresponding to detections and a controller for producing azimuth and elevation signals; a map subcell ordering memory having a plurality of priority maps for storing subcell locations; a priority memory responsive to said range, azimuth and elevation signals for producing priority map addresses; a submap decoder responsive to said ranges azimuth and elevation signals for producing subcell addresses, said ordering memory having a gate matrix for each priority, each gate matrix being responsive to said subcell and priority map addresses to store a subcell address in a selected one of said priority maps; first counter means to count the detections of the highest priority from one priority map; a general purpose computer having an $N_{max}$ output signal proportional to the number of new track initiations allocated by said computer; said priority memory including a plurality of counters connected to respective corresponding priority maps to store the priority thereof; output means responsive to said range signals and said $N_{max}$ signal for decrementing said priority memory counters; ; an output gate connected from said ordering memory; a comparator connected from said first counter means and from said computer to said output gate to pass track initiations via said output gate less than $N_{max}$ in number to said computer and to said priority memory, said priority memory counters being incremented on receipt of a track detection, an increased count in said priority memory counters representing a lower priority.

2. The invention as defined in claim 1, wherein said output means includes a first auxiliary counter, a first auxiliary comparator, a second auxiliary counter, and second auxiliary comparator, said first auxiliary counter being connected from said radar signal processor to produce an output signal $N_D$ proportional to the total detections, said first auxiliary comparator being connected from said first auxiliary counter and said computer to cause said second auxiliary counter to count up one increment when $N_D < N_{max}$ but not to exceed the number of said priority memory counters $N_p$, and to cause said second auxiliary counter to reset when $N_D > N_{max}$, said second auxiliary compartor decrementing said priority memory counters when the output of said second auxiliary counter is greater than $N_p$.

* * * * *